(12) United States Patent
Dietl

(10) Patent No.: US 7,502,934 B2
(45) Date of Patent: Mar. 10, 2009

(54) ELECTRONIC SIGNATURES

(75) Inventor: Josef Dietl, Nussloch (DE)

(73) Assignee: SAP Aktiengesellschaft, Walldorf (DE)

(*) Notice: Subject to any disclaimer, the term of this patent is extended or adjusted under 35 U.S.C. 154(b) by 811 days.

(21) Appl. No.: 10/738,664

(22) Filed: Dec. 16, 2003

(65) Prior Publication Data

US 2005/0132196 A1    Jun. 16, 2005

(51) Int. Cl.
*H04L 9/00* (2006.01)

(52) U.S. Cl. .................. 713/176; 713/179

(58) Field of Classification Search ............. 713/176, 713/179
See application file for complete search history.

(56) References Cited

U.S. PATENT DOCUMENTS

| | | | |
|---|---|---|---|
| 5,606,609 A * | 2/1997 | Houser et al. ............... | 713/179 |
| 5,818,955 A | 10/1998 | Smithies et al. | |
| 2002/0129256 A1 * | 9/2002 | Parmelee et al. ............ | 713/180 |
| 2003/0195935 A1 | 10/2003 | Leeper | |
| 2005/0132195 A1 | 6/2005 | Dietl | |

FOREIGN PATENT DOCUMENTS

WO    WO 00/11834    3/2000

OTHER PUBLICATIONS

Adobe Systems Incorporated, "Adobe Acrobat 4.0: Frequently Asked Questions," undated materials, copyright 1999, 14 pgs.
Adobe Systems Incorporated, "Adobe Acrobat 5.0: Digitally Sign PDF Documents," undated materials, copyright 2001, 3 pgs.
Adobe Systems Incorporated, "Adobe Digital Signature Appearances: Version: Acrobat 6.0," May 2003, 20 pgs.
Adobe Systems Incorporated, "Protecting Electronic Documents with Adobe Security Solutions: Persistent Access Control and Digital Signatures Add Additional Security and Reliability to Electronic Document Exchange," undated materials, copyright 2003, [online], [retrieved from the Internet: http://www.adobe.com/security/pdfs/acrobat_security_wp.pdf], 11 pgs.
Adobe Systems Incorporated, "Sample Signatures for Use with Acrobat Digital Signature Plug-Ins," undated materials, 3 pgs.

(Continued)

*Primary Examiner*—Jacob Lipman
*Assistant Examiner*—Kambiz Zand
(74) *Attorney, Agent, or Firm*—Fish & Richardson P.C.

(57) ABSTRACT

Methods, apparatus, including computer program products, and systems implement and use techniques relating to electronic signatures. In one implementation, a one-way hash is calculated for an electronic document and a digital watermark representing the one-way hash is embedded in a signature document. Based on a user input, the signature document having the embedded digital watermark is altered, and the electronic document is associated with the signature document. The electronic document and the signature document together comprise a signed electronic document. The user input can include biometric information, such as a handwritten signature or a voice recording. For additional security, the one-way hash can be encrypted before a representation of the hash is embedded in the signature document.

33 Claims, 7 Drawing Sheets

OTHER PUBLICATIONS

Digimarc Corporation, "Glossary: Digimarc Digital Watermarking Terms and Definitions," undated materials, copyright 2003, [online], [retrieved from the Internet on Oct. 13, 2003: http://www.digimarc.com/watermarking/glossary.asp], 2 pgs.

Digimarc Corporation, "Technology Overview: A Digimarc Digital Watermark Is Imperceptible to the Human Eye," undated materials, copyright 2003, [online], [retrieved from the Internet on Oct. 13, 2003: http://www.digimarc.com/watermarking/techOverview.asp], 1 pg.

"Digital Watermarking Technology," undated materials, [online], [retrieved from the Internet on Oct. 13, 2003: http://www.rl/af/mil/div/IFB/techtrans/datasheets/H2Omark.html], 2 pgs.

Kutter, Dr. Martin, et al., "Digital Watermarking Technology," undated materials, copyright 2000 by AlpVision, [online], [retrieved from the Internet: http://www.alpvision.com/DOWNLOAD/watermarking.pdf], 4 pgs.

Petitcolas, Fabien, et al., "Digital Watermarking Frequently Asked Questions (FAQ)," Oct. 14, 2001, copyright 2000-2002 by Watermarking World, [online], [retrieved from the Internet on Oct. 23, 2003: http://www.watermarkingworld.org/faq.html], 6 pgs.

"Public Key Encryption and Digital Signatures," PowerPoint presentation, undated materials, [online], [retrieved from the Internet on Oct. 13, 2003: source unknown], 28 pgs.

Simon, Ed, et al., "An Introduction to XML Digital Signatures," undated materials, [online], [retrieved from the Internet on Oct. 13, 2003: http://www.xml.com/lpt/a/2001/08/08/xmldsig.html], 6 pgs.

The Youd Zone, "What is a Digital Signature?" undated materials, [online], [retrieved from the Internet on Oct. 13, 2003: http://www.youdzone.com/signature.html], 4 pgs.

International Search Report and Written Opinion of the International Searching Authority, PCT Application Serial No. PCT/EP2004/014246, Mar. 11, 2005, 12 pp.

International Preliminary Report on Patentability and Written Opinion of the International Search Authority, PCT/EP2004/014246, Jun. 29, 2006, 8 pp.

* cited by examiner

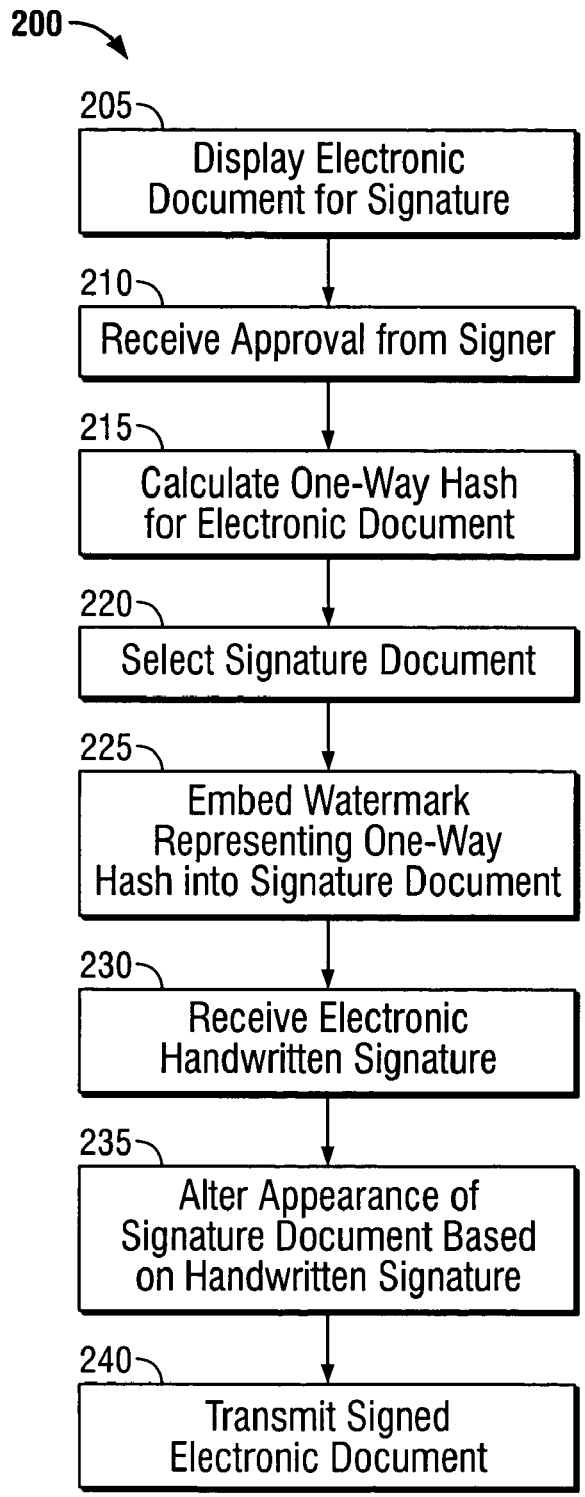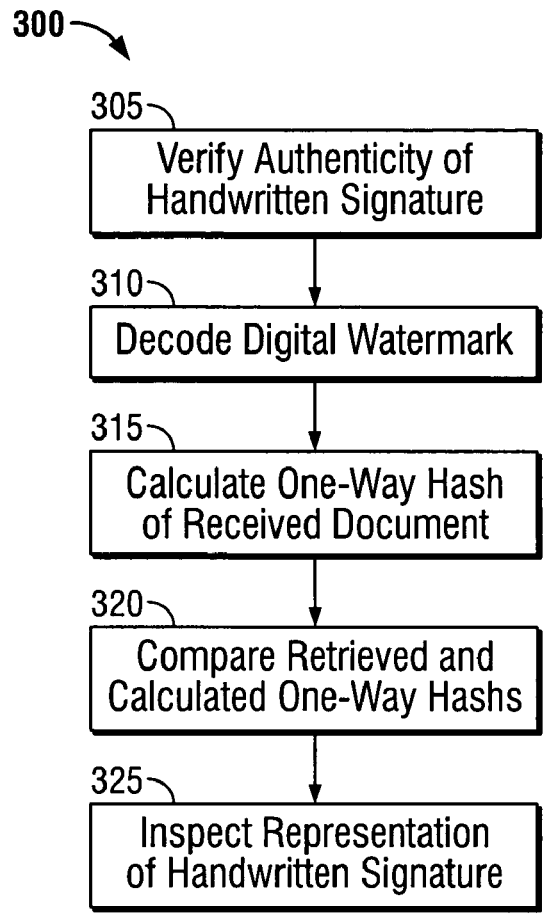
FIG. 2
FIG. 3

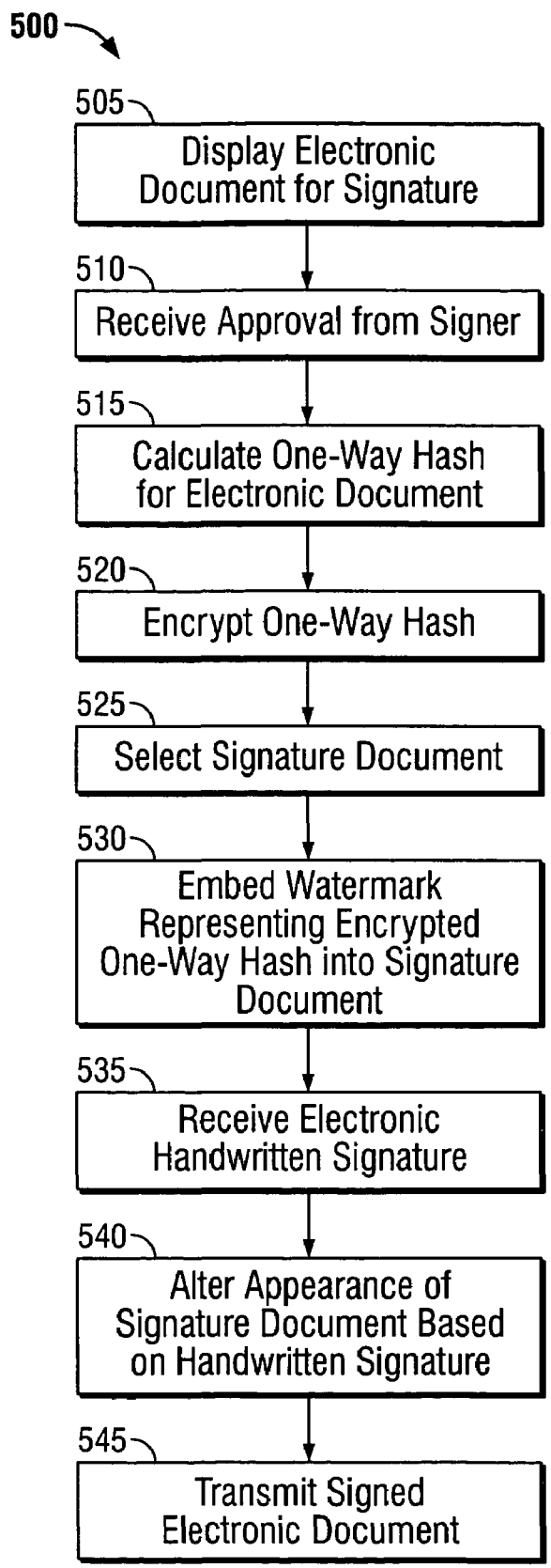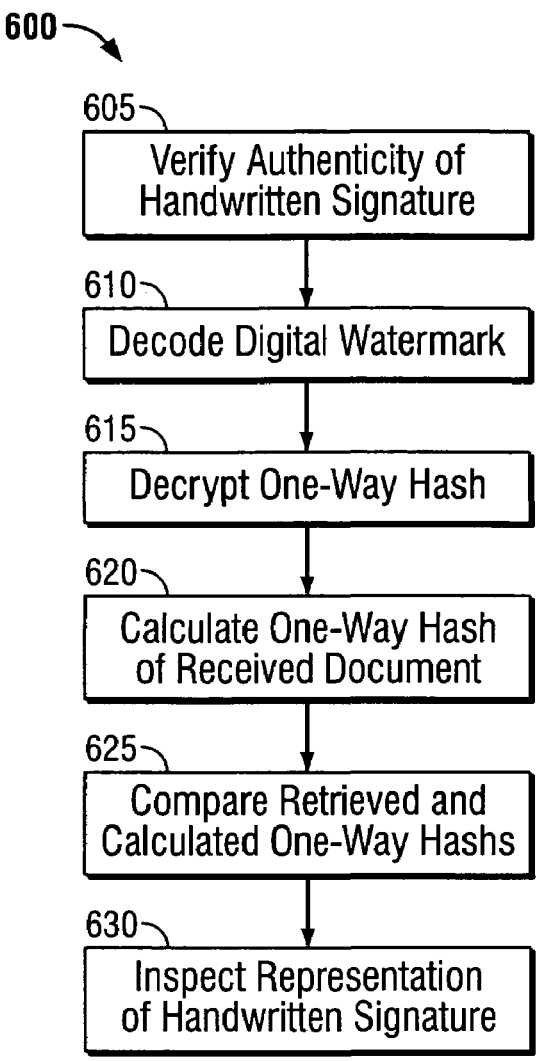
FIG. 5
FIG. 6

ELECTRONIC SIGNATURES

BACKGROUND

The following description relates to electronic signatures. An electronic signature can be used to authenticate the contents of an electronic document by the signer, similar to a manual signature handwritten in ink. Electronic signatures are also used when electronically transmitting documents or messages, to identify the sender and authenticate the message data.

Conventional electronic signatures use public-key encryption. Public key cryptography uses public-private key pairs for creating an electronic signature, electronic signature verification and encryption and decryption of data for security during electronic transmission. A public key owned by an individual receiving the data (the "recipient") is used by a sender to encrypt the data. The recipient then uses the recipient's corresponding private key to decrypt the data. In order to encrypt the data, the sender must have access to the recipient's public key. Alternatively, a private key owned by the sender can be used to encrypt the data, and the recipient then uses the sender's public key to decrypt the data, and therefore requires access to the sender's public key.

When electronically signing data, a sender signs the data using the sender's private key. This operation can involve using the private key to encrypt a "cryptographic hash" of the data that is being signed, and then making available to the recipient the signed data and the encrypted hash. The recipient verifies the signature by computing a hash over the data using the sender's public key, decrypting the encrypted hash of the signature and comparing the two hashes. If the hashes match, then the data is authenticated.

Typically, a public key for another individual (the sender, for example) is obtained by obtaining an individual's public key certificate directly or indirectly from that individual. A certificate is an electronic data object including a public key, and can be issued by a trusted third party, such as a certificate authority, that verifies the identity of the certificate holder. The certificate can also include the name of the certificate authority and the name of the individual or entity for whom the certificate is issued. The recipient of an electronically signed document can verify the identity of the sender (signer) by verifying the certificate of the sender. A public key certificate for someone else can be obtained in a number of ways, for instance, the certificate can be found in a searchable database on a server, or the certificate owner can include the certificate as an attachment to an e-mail message sent to a recipient. A corresponding private key certificate must be kept secret; for example, the certificate can be protected by a password or other organizational measures.

SUMMARY

Systems and techniques relating to electronic signatures are described. In general, in one aspect, these systems and techniques feature calculating a one-way hash for an electronic document and embedding a digital watermark representing the one-way hash in a signature document. Based on a user input, an appearance of the signature document having the embedded digital watermark is altered, and the electronic document is associated with the signature document. The electronic document and the signature document together comprise a signed electronic document.

Implementations can include one or more of the following. The user input can be a handwritten signature and altering an appearance of the signature document can include applying a visual representation of the handwritten signature to a graphical representation of the signature document. Alternatively, the user input can be a password and altering an appearance of the signature document can include applying a visual representation of the password to a graphical representation of the signature document. In another alternative, the user input can be biometric data and altering an appearance of the signature document can include applying a visual representation of the biometric data to a graphical representation of the signature document. The visual representation of the handwritten signature, the biometric data, or the password can be a black line. The signature document can be derived from a digital image; the one-way hash can be a checksum.

In one implementation, the one-way hash can be encrypted, and a representation of the encrypted one-way hash can be embedded as a digital watermark in the signature document. Encrypting the one-way hash can include using a private key associated with a device used to calculate the one-way hash.

In general, in another aspect, the systems and techniques feature receiving a signed electronic document including an electronic document and a signature document. The signature document includes an electronic signature applied to an image and a digital watermark representing a first one-way hash embedded in the image. The first one-way hash is obtained from the image, and a second one-way hash is calculated for the electronic document. The first one-way hash is compared to the second one-way hash, and the signed electronic document is verified based at least in part on the one-way hash comparison.

Implementations can include one or more of the following. The electronic signature applied to an image can be a black line representing a handwritten signature applied to a graphical representation of an image. The electronic handwritten signature can be compared to a valid signature specimen, and the signature document can be verified based at least in part on the signature comparison. Alternatively, the electronic signature applied to an image can be a black line representing a password applied to a graphical representation of an image. The password can be compared to an expected password, and the signature document can be verified based at least in part on the password comparison. The black line can be inspected for indications of alterations to the image after the black line was applied.

In one implementation, the first one-way hash embedded in the signature document can be encrypted, and is decrypted before a comparison to the second one-way hash. Decrypting the first one-way hash can include using a public key associated with a device used to calculate the first one-way hash.

In general, in another aspect, the systems and techniques feature calculating a one-way hash for an electronic document and embedding a digital watermark representing the one-way hash in an audio signature file. Based on a user input, a sound of the audio signature file having the embedded digital watermark is altered, and the electronic document is associated with the audio signature file. The electronic document and the audio signature file together are a signed electronic document.

In one implementation, the one-way hash can be encrypted, and a representation of the encrypted one-way hash can be embedded as a digital watermark in the sound file. Encrypting the one-way hash can include using a private key associated with a device used to calculate the one-way hash.

In general, in another aspect, the systems and techniques feature receiving a signed electronic document including an electronic document and an audio signature file. The audio signature file includes an electronic voice signature applied to an audio recording and a digital watermark representing a first one-way hash embedded in the audio recording. A first one-way hash is obtained from the audio recording, and a second one-way hash is calculated for the electronic document. The first one-way hash is compared to the second one-way hash, and the signed electronic document is verified based at least in part on the one-way hash comparison.

In one implementation, the first one-way hash is encrypted before a representation of the hash is embedded in the audio recording, and is decrypted before a comparison to the second one-way hash. Decrypting the first one-way hash can include using a public key associated with a device used to calculate the first one-way hash.

In general, in another aspect, the systems and techniques feature receiving at a signing device an electronic document provided by a source device and preventing alterations to the electronic document on the signing device. A signature document is generated by calculating a one-way hash for the electronic document and embedding a digital watermark representing the one-way hash in an arbitrary digital representation. A characteristic of the signature document is altered based on a user input. The electronic document is associated with the signature document, and the electronic document and the signature document together comprise a signed electronic document.

Implementations can include one or more of the following. The one-way hash can be encrypted and the digital watermark can represent the encrypted one-way hash. The one-way hash can be encrypted using a private key associated with the signing device.

The arbitrary digital representation can be a digital image, the user input can be biometric data, such as a handwritten signature, and altering a characteristic of the signature document can include applying a visual representation of the biometric data to a graphical representation of the signature document. The visual representation of the biometric data can be a black line. Alternatively, the arbitrary digital representation can be an audio file, the user input can be a voice recording, and altering a characteristic of the signature document can include overlaying the voice recording over the audio file.

Preventing alterations to the electronic document can include using a limited functionality signing device and one or more security features of the device. The one-way hash can be a checksum. The signed electronic document can be provided to the source device. The electronic document can be generated by the source device.

In general, in another aspect, a system features a source device and a signing device. The source device includes an interface configured to receive an electronic document, to transmit the electronic document to a dedicated signing device, and to receive a signed electronic document from a dedicated signing device. The signed electronic document includes the electronic document and an associated signature document including a digital image embedded with a digital watermark representing an encrypted one-way hash. The source device further includes a processor configured to calculate a one-way hash of the electronic document, decode the digital watermark representing the encrypted one-way hash, decrypt the encrypted one-way hash, and compare the decrypted one-way hash to the calculated one-way hash.

The dedicated signing device includes a user interface configured to receive a user input, and an external interface configured to receive an electronic document from a source device and to transmit a signed electronic document to the source device. The signed electronic document includes the electronic document and an associated signature document. The dedicated signing device further includes a processor configured to alter a characteristic of a signature document based on the user input, the signature document including an arbitrary digital representation.

The processor of at least one of the source device or the dedicated signing device is further configured to calculate a one-way hash for the electronic document, encrypt the one-way hash, and embed a digital watermark representing the encrypted one-way hash into the arbitrary digital representation.

Implementations of the system can include one or more of the following. The arbitrary digital representation can be a digital image, the user input can be a handwritten signature, and altering a characteristic of the arbitrary digital representation can include applying a visual representation of the handwritten signature to a graphical representation of the signature document. Alternatively, the arbitrary digital representation can be an audio file, the user input can be a voice recording, and altering a characteristic of the arbitrary digital representation can include overlaying the voice recording over the audio file.

In general, in another aspect, a signing device features an external interface configured to receive an electronic document from a source device, a user interface configured to receive a handwritten signature and a processor. The processor is configured to generate a signature document by calculating a one-way hash for the electronic document, encrypting the one-way hash and embedding a digital watermark representing the encrypted one-way hash in a digital image. The processor is further configured to alter an appearance of the signature document by applying a visual representation of the handwritten signature to a graphical representation of the digital image, and to associate the electronic document with the signature document. The electronic document and the signature document together comprise a signed electronic document. The signing device further includes a security feature to prevent alteration of a received electronic document.

The invention can be implemented to realize one or more of the following advantages. An electronic document can be electronically signed without using public-private key pair encryption, thereby avoiding the requirement to obtain a public key certificate (from a trusted source) for a signer, to verify an electronic signature. A comparison of a one-way hash (e.g., a checksum) calculated for the electronic document at the time of signing and a one-way hash calculated at the time of verification provides a simple way to prove the integrity of the contents of a signed document. The identity of the signer of an electronic document can be verified by comparing an electronic handwritten signature applied by the signer to a signature document at the time of signing to a valid, signature specimen of the signer. Alternatively, a recipient of a signed electronic document who is familiar with the signer's handwritten signature can satisfy himself/herself as to the authenticity of the signer by a quick visual inspection—a practice which is common and accepted with signatures handwritten in ink.

A representation of the one-way hash calculated at the time of signing is embedded as a digital watermark in the signature document before the electronic handwritten signature is applied. Once the electronic handwritten signature is applied, attempts to tamper with or remove and replace the digital watermark, or to apply a second digital watermark, can be detected by inspecting a black line representing the electronic handwritten signature for alterations. For additional security, the one-way hash calculated at the time of signing can be encrypted using a private key belonging to a device used for the electronic signature process, and a representation of the encrypted one-way hash is embedded in the signature document. A recipient of the signature document can decrypt the one-way hash obtained from the signature document using a corresponding public key certificate. By using a public-private key pair associated with a signing device, rather than a signer, there is no requirement to exchange a public key certificate each time a different person creates an electronic signature using the signing device. A device dedicated to creating electronic signatures, with no peripheral functionality, can further reduce the risk of a forged electronic signature or falsification of the contents of a signed electronic document.

Electronically signing without use of public and private keys can avoid some potential breaches of the integrity of a private key which can occur, for example, if a signing device belonging to a recipient of the signature is being used to create a signature. By way of illustration, consider a salesman with a Tablet PC delivering an order to a customer, and requiring the customer's electronic signature on a delivery receipt. If the customer has public-private key certificates, then the saleman's Tablet PC requires access to the customer's private key certificate, so that the customer can electronically sign the delivery receipt using the saleman's device, and to the customer's public key certificate, so that the electronic signature can be later authenticated. The saleman's Tablet PC could therefore end up with all of the information necessary to create an electronic signature of the customer, i.e., the public and private key certificates, thereby compromising the integrity of the customer's private key certificate. A scenario, such as the one above, which can lead to falsification of an electronic signature, is avoided by eliminating the need to use public-private key pairs associated with a signer when creating an electronic signature.

Details of one or more implementations are set forth in the accompanying drawings and the description below. Other features and advantages may be apparent from the description, drawings and claims.

DRAWING DESCRIPTIONS

These and other aspects will now be described in detail with reference to the following drawings.

FIG. 2 is a flowchart showing a process for creating an electronic signature.

FIG. 3 is a flowchart showing a process for verifying an electronic signature.

FIG. 5 is a flowchart showing a process for creating an electronic signature using the sending device of FIG. 4.

FIG. 6 is a flowchart showing a process for verifying an electronic signature using the receiving device of FIG. 4.

Like reference symbols in the various drawings indicate like elements.

DETAILED DESCRIPTION

The systems and techniques described here relate to electronic signatures applied to electronic documents. The terms "electronic document" and "document" mean a set of digital data, including both electronic data stored in a file and electronic data received over a network. An electronic document does not necessarily correspond to a file. A document may be stored in a portion of a file that holds other documents, in a single file dedicated to the document in question, or in a set of coordinated files.

A conventional signature handwritten in ink can be authenticated to confirm that a purported signer created the signature. There may be no way of knowing, however, whether the content of a signed document has been altered after the signature was applied. A conventional electronic signature using public-key encryption can be used to authenticate data integrity of a signed document, but requires access to the signer's public key certificate or equivalent information from a trusted source. Additionally, the signer's private key certificate is required to create the electronic signature, which can be impractical in some applications. For example, if a signer is creating an electronic signature on a delivery receipt using a signing apparatus (e.g., tablet PC) belonging to a deliveryman, the deliveryman's signing apparatus requires access to the signer's private key certificate, thereby potentially compromising the integrity of the signer's private key.

Figure 1:
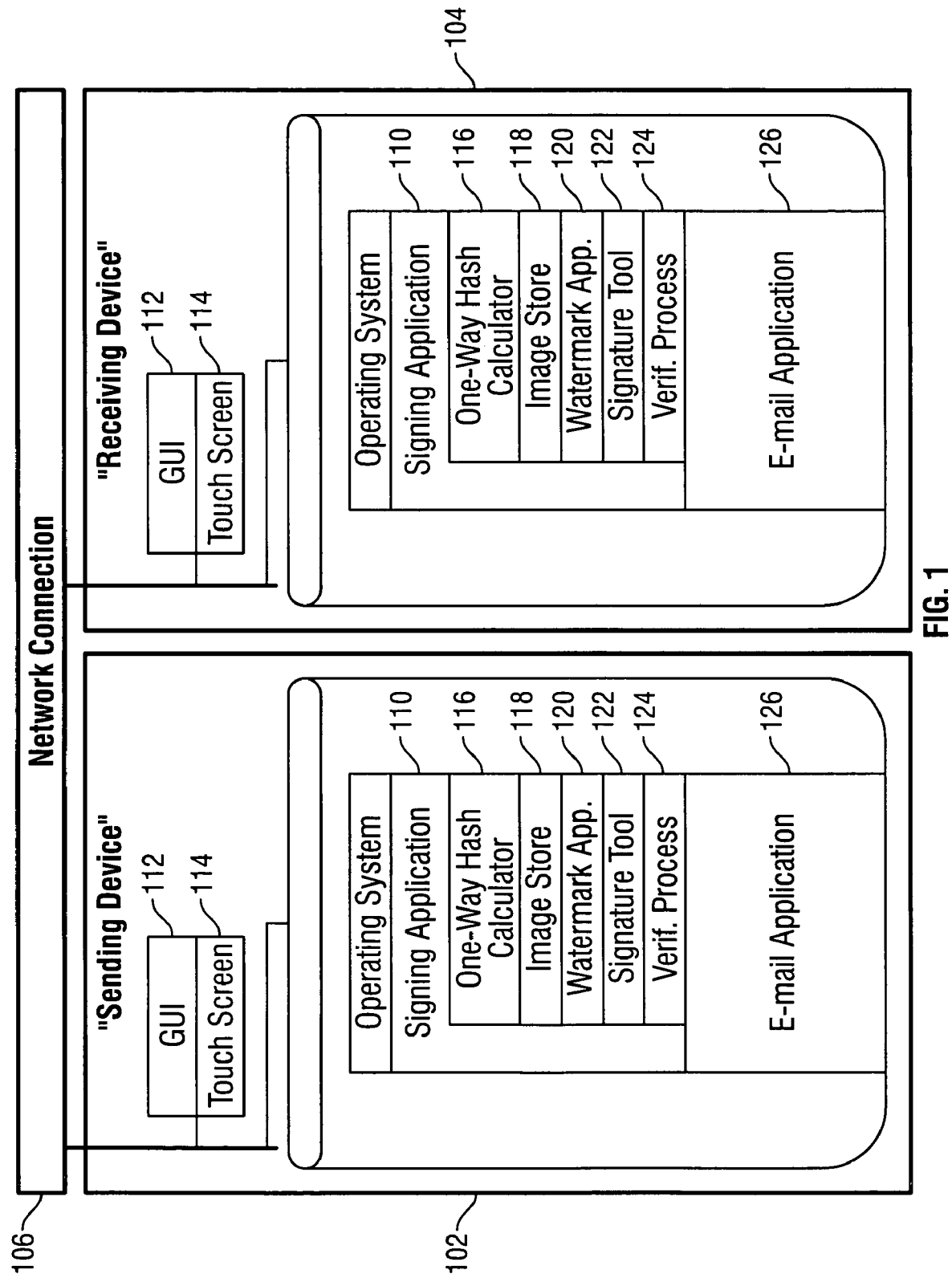
FIG. 1 shows a schematic representation of a sending device and a receiving device implementing a signing application.

A process for signing an electronic document with an electronic signature, whereby an electronic handwritten signature and the integrity of the contents of the electronic document can be verified without requiring a signer's private or public key, can be implemented in a signing application 110 executing on a sending device 102, shown in FIG. 1. The sending device 102 can include a graphical user interface 112 to display an electronic document to a user and a user interface 114, such as a touch screen, configured to receive an electronic handwritten signature applied to a separate signature document, which signature document is encoded with data from the electronic document. The graphical user interface 112 and the touch screen 114 can be implemented as a single user interface, for example, in an implementation where the signing application 110 executes on a Tablet PC. The signing application and/or components of the signing application (e.g., a watermarking application 120) can be implemented as software executing on a programmable processor. In another implementation, the signing application 110 executes on a server in communication with the sending device 102.

A typical use of an electronic signature is to sign an electronic document before transmitting the document electronically to a recipient, so the recipient can verify the electronic signature to prove the integrity of the contents of the received electronic document. Other uses are possible, including applying an electronic signature to a contract to create a legally binding agreement. For the purpose of describing the signing application 110, an exemplary use shall be described, whereby a sender uses a sending device 102 to apply an electronic signature to an electronic document and transmits the signed electronic document over a network connection 106, such as the Internet, to a receiving device 104, where a recipient may verify the electronic signature.

As shown in FIGS. 1 and 2, the sending device 102 displays the electronic document to be signed by the sender on a graphical user interface 112, such as a touch screen on a Tablet PC or a display screen on a laptop computer (step 205). The sender can review the contents of the electronic document, as displayed on the graphical user interface 112, before applying the sender's signature. The sender indicates he or she is prepared to sign the electronic document, for example, by highlighting a "sign now" icon or the like displayed by the sending device 102 (step 210). A one-way hash calculator 116 then calculates a one-way hash (e.g., a checksum) for the electronic document (step 215).

The sender's electronic handwritten signature is applied to a second electronic document, which will be referred to as the "signature document" or "image document". A signature document can be thought of as the signature page of a paper-based contract, for example. That is, the signature document attaches to, or is otherwise associated with, the electronic document and together they form a "signed electronic document". In one implementation, the electronic document can be stored on a server accessible over the Internet, and the signature document can include a hyperlink to the electronic document, thereby associating the electronic document and the signature document. In another implementation, a multi-document structure, such as the MIME-multipart format, can be used. For example, the electronic and signature documents can be attached to an e-mail and an e-mail application can turn the two attached documents into a MIME-multipart format e-mail message.

The signature document may be derived from an image, such as a digital image in JPEG format. Alternatively, the signature document may be derived from a document that includes textual information as well as a digital image. A JPEG format image can include internal comment fields for textual information (e.g., in the so-called "EXIF" format). The comment fields can be used to establish a link between the signature document and the electronic document, for example, by writing a reference such as a hyperlink or a document identifier into the comment fields. The comment fields are typically independent from the actual image data, so information included in the comment fields does not interfere with, and is not subject to, the watermarking process.

In this example, the signature document is derived from a digital image. The content of the image is arbitrary. For example, the image can be a representation of the person signing the electronic document or some other randomly selected object. The image is selected, for example, by the sender selecting an image from an image store 118, a default image being provided by the signing application 110, or by the sender importing an image to use when signing the electronic document (step 220). A digital watermarking application 120 embeds a digital watermark representing the one-way hash calculated for the electronic document into the image (step 225).

Differing digital watermark technologies are available and can be used. For the present purposes, a digital watermark that is robust under modifications to the image (e.g., printing, scanning, resizing, or altering the image with, for example, a handwritten signature) and distributes the digital watermark over the image, such that superimposition of a second digital watermark would invariably modify the black line forming the handwritten signature at least enough to be detectable in a computer analysis of the image, is desirable. For example, a wavelet-based digital watermark exhibits the desired characteristics, i.e., robust and distributed.

The signature document (i.e., the digital image with the digital watermark applied) is displayed to the sender on the touch screen 114, and a signature tool 122 prompts the sender to apply an electronic handwritten signature over the signature document. For example, the signature document (i.e., the watermarked image) is displayed on the touch screen of a Tablet PC. Using an electronic pen, the sender writes the sender's signature across the signature document (step 230). The signature tool 122 alters the appearance of the signature document based on the sender's signature (step 235), for example, the sender's signature can be applied to the signature document as a black line, irrevocably altering the underlying image data. The signed electronic document, that is, the electronic document and the signature document, can be transmitted electronically to the recipient at a receiving device 104, for example, using an e-mail application 126 and a network connection 106 (step 240). The sender optionally can print a hardcopy of the electronic document and signature document to create a permanent record of the contents of the electronic document at the time of signing.

The recipient can verify the authenticity of the electronic handwritten signature and the integrity of the contents of the electronic document according to a process 300 shown in FIG. 3. The electronic handwritten signature is verified as an authentic signature created by the sender (step 305), for example, by comparing the signature to a known, valid signature specimen of the sender. A handwriting expert can compare the electronic handwritten signature to a valid signature specimen using conventional techniques, someone who is familiar with the sender's signature can verify the handwritten signature by visual inspection, or the signature can electronically be compared to a digitized valid signature specimen.

To authenticate the contents of the signed electronic document, that is, to confirm the contents were not modified after the electronic document was signed, a digital watermarking application 120 decodes the digital watermark to extract the one-way hash (step 310). A one-way hash calculator 116 calculates a one-way hash (e.g., a checksum) for the electronic document received from the sender (step 315). A verification process 124 compares the one-way hash retrieved from the signature document to the one-way hash calculated for the received electronic document (step 320). Optionally, a black line on the signature document representing the handwritten signature can be inspected (e.g., as described below) to confirm the digital watermark was not altered, or removed and replaced, after the handwritten signature was applied to the signature document (step 325).

If the one-way hashes match, then the contents of the electronic document were not modified since the document was signed, and the integrity of the contents is proven. If the one-way hashes do not match, then the electronic document received from the sender does not accurately reflect the contents of the electronic document when the sender applied his or her signature to the electronic document.

If the contents of the electronic document are altered after the document is signed, then the one-way hash calculated for the received electronic document will not match the one-way hash retrieved from the digital watermark. However, if the contents of the electronic document were altered after the document was signed, and the one-way hash embedded in the signature document (i.e., the digital watermark) was altered, or removed and replaced, then the one-way hashes might match, even though the contents have been altered. Applying the electronic handwritten signature to the signature document after the digital watermark is applied prevents such tampering with the signature document.

If the digital watermark is altered, for example, to change the one-way hash, the black line forming the handwritten signature is also altered. Although a digital watermark can be imperceptible to the human eye, the digital watermark does alter the underlying image data. Therefore, by modifying or removing and replacing the digital watermark, the black line of the electronic signature, which once applied forms part of the underlying image data, is altered. For example, a black line can be a represented by a string of zeros in a bit field of the image, and therefore any alteration of the black line signature is readily detectable, as the string will include values other than zero. Similarly, a second digital watermark can not be applied to the signature document once the electronic handwritten signature is applied without altering the black line of the signature.

The handwritten signature can be represented by something other than a black line, for example, a pure white line can be used. Other pure colors can also be used. For example, in an RGB color scheme, the signature can be represented as a pure primary (i.e., red, green, or blue) or secondary (i.e., a combination of two of red, green, and blue) color. The representation is selected such that a subsequently applied digital watermark, or an alteration of the original digital watermark, can be unambiguously detected; a representation—such as a black line—that is in stark contrast to the underlying image eases manual verification of the handwritten signature and detection of alterations.

The contents of the electronic document can thereby be verified by comparing the one-way hash embedded in the signature document to a one-way hash calculated for the electronic document received in association with the signature document. The validity of the embedded one-way hash can be verified by inspecting the black line representing the electronic handwritten signature for alterations indicating the digital watermark was tampered with, or that a second digital watermark was applied to the signature document after the handwritten signature was applied.

In another implementation, the sender can input some form of data other than an electronic handwritten signature, such as, a password, and a visual representation of the password can be applied to alter the image, in the same manner as the electronic handwritten signature. That is, the sender can handwrite the password over the image, thereby altering the underlying image data. Alternatively, the sender can input the password, for example, using a keyboard, and the signing tool 122 can apply a visual representation (e.g., black line) of the password to the image, thereby altering the underlying image data. The recipient can verify the electronic signature if the one-way hashes match, and if the password applied to the signature document matches a password the recipient was expecting. The recipient can verify the password manually, or alternatively, the verification process 124 can compare the password to a data store of acceptable passwords, for example, a password database. However, because a password can be easily duplicated once known by others, preferably a unique, biometric identifier, such as a handwritten signature or possibly a scanned fingerprint, is used to electronically sign a document.

A recipient of a signed electronic document can authenticate the contents of the electronic document with a device capable of reading the digital watermark and calculating a one-way hash of the electronic document. The device can be a Tablet PC, as discussed above, a laptop computer, a PDA (personal digital assistant), a PC, or a dedicated device that has a graphical user interface and that can execute the signing application. Other implementations are possible, and the above list is not exhaustive.

There can be some uses for the electronic signature process described above where the signing application 110 executes in a device dedicated to electronically signing documents. For example, the electronic signature process can be used by a courier service that requires a signature of the customer upon receipt of a package. A courier can use a portable signing device to present an electronic delivery receipt to the customer for an electronic signature to prove delivery of the package. The signed electronic delivery receipt can then be transmitted from the portable signing device to a database server of the courier service, for example, to maintain as a record of the delivery. In some applications, such as the courier example, adding an additional level of security to an electronic signature created according to the techniques described above can be beneficial.

In one implementation, the one-way hash calculated for the electronic document before the electronic document is signed is encrypted using a private key of the sending device 102, and the encrypted one-way hash is embedded in the signature document as a digital watermark. A receiving device 104 requires the public key of the sending device 102 to decrypt the one-way hash once the one-way hash is retrieved from the signature document. Alternatively, both an encrypted one-way hash and an unencrypted one-way hash can be embedded into the signature document, and the authenticity can be verified using either one, depending on the level of security desired. The one-way hash can be encrypted using any convenient technique including, for example, the Diffie-Hellman key agreement protocol, the RSA algorithm or elliptic curves algorithms.

Figure 4:
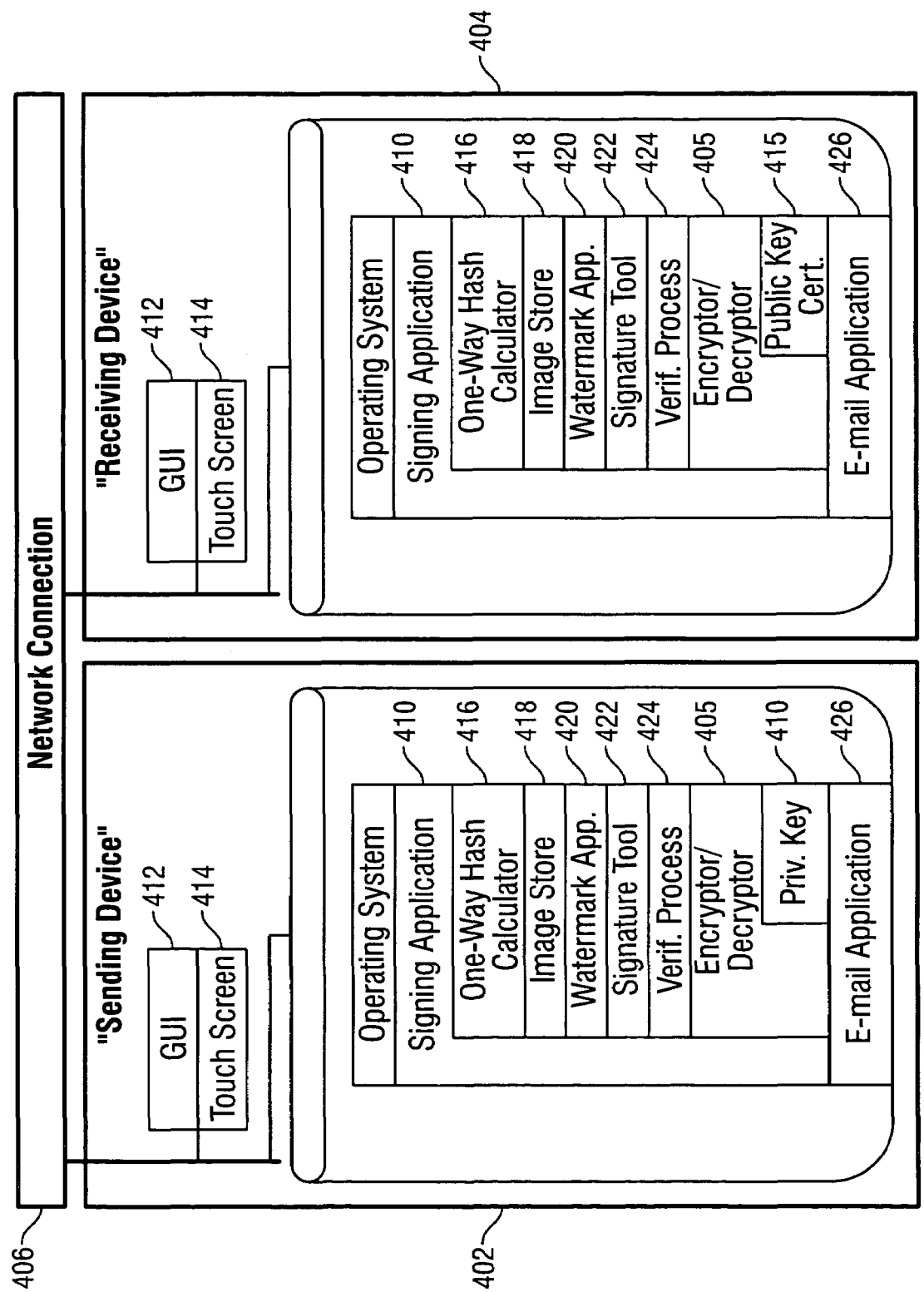
FIG. 4 shows a schematic representation of a sending device and a receiving device implementing a signing application using a public-private key pair associated with the sending device.

FIG. 5 shows a process 500 for creating an electronic signature using a signing application 410 executing in an exemplary sending device 402 shown in FIG. 4. The signing application 410 includes an encryptor/decryptor 405 that can encrypt a one-way hash for an electronic document calculated with a one-way hash calculator 416. The electronic signature is created in a similar manner as described above in reference to FIG. 2. An electronic document to be signed by a sender is displayed on a graphical user interface 412 (step 505). The sender can indicate that he/she is prepared to sign the electronic document, for example, by clicking a "sign now" icon, highlighting a menu item, or the like (step 510). The one-way hash calculator 416 calculates a one-way hash (e.g., a checksum) for the electronic document (step 515). The encryptor/decryptor then encrypts the one-way hash using a private key 410 belonging to the sending device 402 (step 520).

A signature document, for example, an image file from an image store 418, is selected (step 525), and a watermarking application 420 embeds a digital watermark into the signature document using conventional digital watermarking technology, where the digital watermark represents the encrypted one-way hash (step 530). A user input is received (step 535), such as a handwritten signature or password. The appearance of the signature document is altered based on the user input (step 540), for example, by applying a black line representing the signature to the underlying image data. The electronic document and the signature document, together forming the signed electronic document, are then transmitted electronically to a receiving device 404 (step 545), for example, over a network connection 406.

The receiving device 404 can verify the electronic signature as described above in reference to FIG. 3, with the additional step of decrypting the one-way hash retrieved from the signature document.

As shown in FIG. 6, the recipient can verify the authenticity of the handwritten signature (step 605), for example, by an electronic comparison to a valid signature specimen or manually using conventional handwriting analysis techniques. Alternatively, if the handwritten signature is a password, the recipient can compare the password to an expected password, or the verification process 424 can search for a match to the password, for example, in a password store.

The watermarking application 420 of the signing application 410 decodes the digital watermark embedded in the signature document and retrieves the encrypted one-way hash (step 610). The encryptor/decryptor 405 decrypts the one-way hash using a public key certificate 415 of the signing device 402 (step 615). The one-way hash calculator 416 calculates a one-way hash for the received electronic document (step 620), and the verification process 424 compares the calculated one-way hash to the one-way hash retrieved from the signature document (step 625). Optionally, a black line on the signature document representing the handwritten signature can be inspected to confirm the digital watermark was not altered or removed and replaced after the handwritten signature was applied to the signature document (step 630).

If the one-way hashes match and the handwritten signature is authenticated, the electronic signature is verified. If either the one-way hashes do not match or the handwritten signature is invalid, the electronic signature is not verified.

Although the technique for creating an electronic signature described in reference to FIGS. 4 and 5 requires use of a public-private key pair, associating the public-private key pair with the sending device, as compared to associating the key pair with a person signing an electronic document, is significant. The significance can be illustrated by considering the use of a dedicated portable signing device in the context of a courier service discussed above. In the example, the recipient of the electronically signed delivery receipt is the courier service, and the courier service owns the portable signing device used by the courier. Thus, the courier service can maintain a store of public key certificates corresponding to the private keys for each of the service's portable signing devices, and can therefore readily decrypt an electronic signature created with such a portable signing device, by accessing a corresponding public key certificate. In this scenario, because the public-private key pairs are within the control of the courier service, there would be no requirement for a trusted third party source of public key certificates, nor would there be a requirement for any exchange of public key certificates each time a document was electronically signed.

By contrast, if a public-private key pair associated with the person signing the electronic document is used, then each time a delivery occurred, to verify an electronic signature, it would be necessary to obtain a public key certificate for the signer. Further, to create the electronic signature, the portable signing device would require the customer's private key certificate, thereby compromising the integrity of the customer's private key. A courier service is expected to make deliveries to anyone, and limiting deliveries to customers who have already provided a public key certificate or and obtaining a public and private key certificate from each new customer would be impractical and inconvenient.

Figure 7:
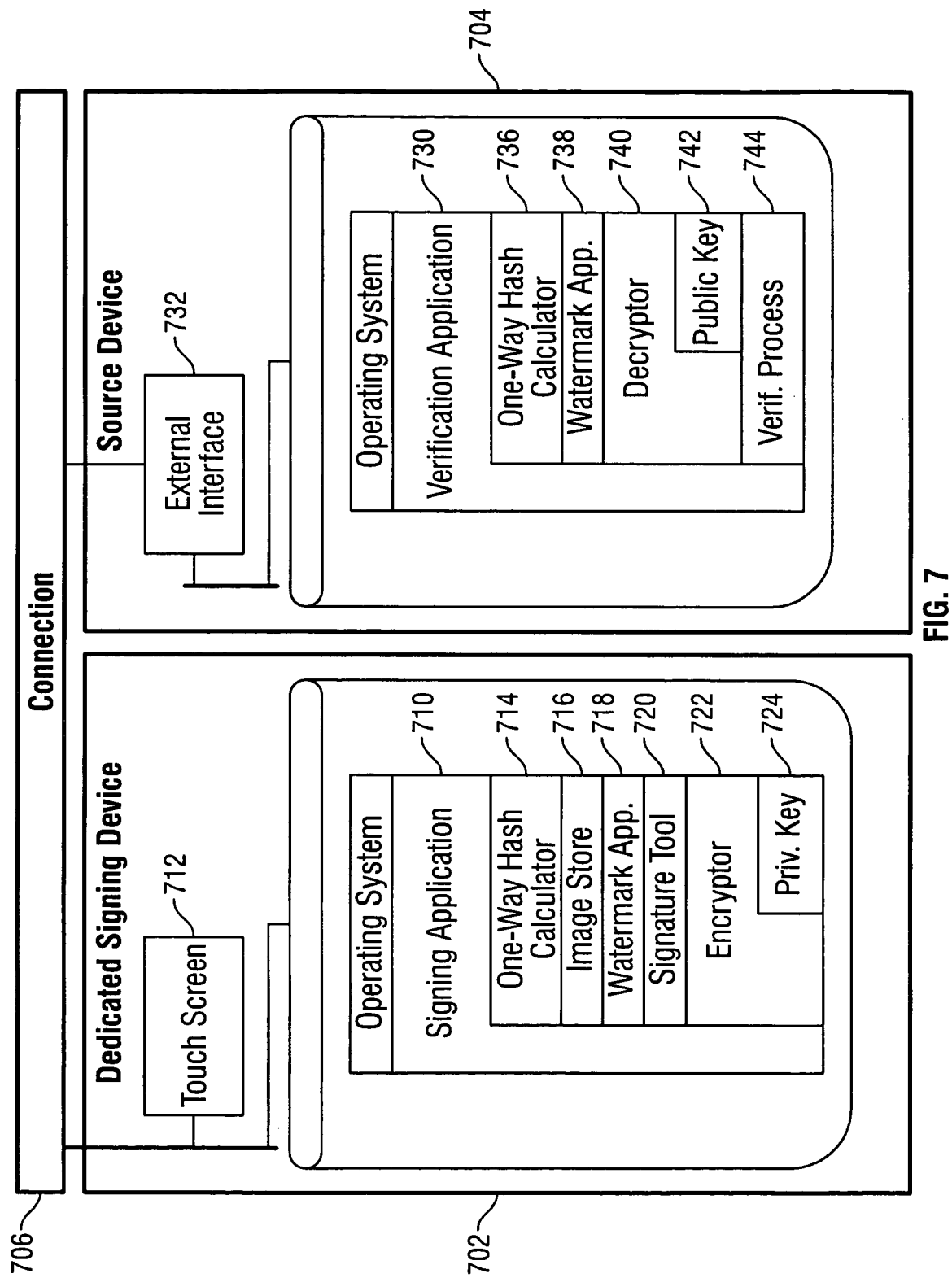
FIG. 7 shows a schematic representation of a designated signing device and a source device.

The electronic signature techniques described above can be further enhanced by implementing the techniques on a device dedicated to electronic signatures, which has no additional functional capabilities and that is tamper-proof (i.e., code cannot be altered). In FIG. 7, a schematic representation of an exemplary dedicated signing device 702 is shown. The dedicated signing device 702 is connected to a source device 704 by a connection 706, for example, a USB connection.

In one implementation, the source device 704 can provide an electronic document to the dedicated signing device 702 for signing, and the electronic document can be either generated using the source device 704 or can be received at the source device 704 via an external interface 732 or otherwise (e.g., downloaded from a diskette or from the Internet). The signed electronic document (i.e., the electronic document together with the signature document) can be transmitted from the dedicated signing device 702 to the source device 704, and a verification application 730 executing on the source device 702 can be used (at least in part) to verify the electronic signature. Alternatively, the signed electronic document can be transmitted from the dedicated signing device 702 to another device, such as a database server (not shown).

The dedicated signing device 702 includes a user interface configured to receive an electronic representation of a handwritten signature, and can be, for example, a touch screen 712 as shown. The user interface 712 can also be configured to display a graphical representation of the contents of an electronic document to be signed, although in some applications a display is not required. For example, the contents of an electronic document to be signed can be displayed by a source device, and a signer can use the designated signing device 702 to sign the electronic document.

The dedicated signing device 702 executes a signing application 710 that includes a one-way hash calculator 714 to calculate a one-way hash of the electronic document. An image store 716 provides a selection of one or more digital images from which a signature document can be derived. An encryptor 722 having access to a private key 724 associated with the dedicated signing device 702 can encrypt a one-way hash calculated by the one-way hash calculator 714.

A watermark application 718 can embed a digital watermark representing an encrypted one-way hash (or, alternatively, unencrypted or both) one-way hash into a digital image. A signer can apply an electronic handwritten signature over the digital image using the touch screen 712. A signature tool 720 can alter a digital image in response to a user input, for example, by applying a black line representing an electronic handwritten signature to the digital image. The dedicated signing device 702 can transmit a signed electronic document, i.e., the electronic document and the signature document, to the source device 704 over the connection 706.

A verification application 730 executing in the source device 704 includes a one-way hash calculator 736 to calculate a one-way hash of an electronic document received by the source device 704 from the dedicated signing device 702. A watermark application 738 can decode a digital watermark embedded in the signature document, and a decryptor 740 can use a public key 742 associated with the dedicated signing device 702 to decrypt the one-way hash represented by the watermark. A verification process 744 can compare the calculated one-way hash to the one-way hash retrieved from the signature document. The electronic handwritten signature can be verified by a visual inspection at the source device 704, or compared electronically to a digitized handwriting specimen.

Figure 8:
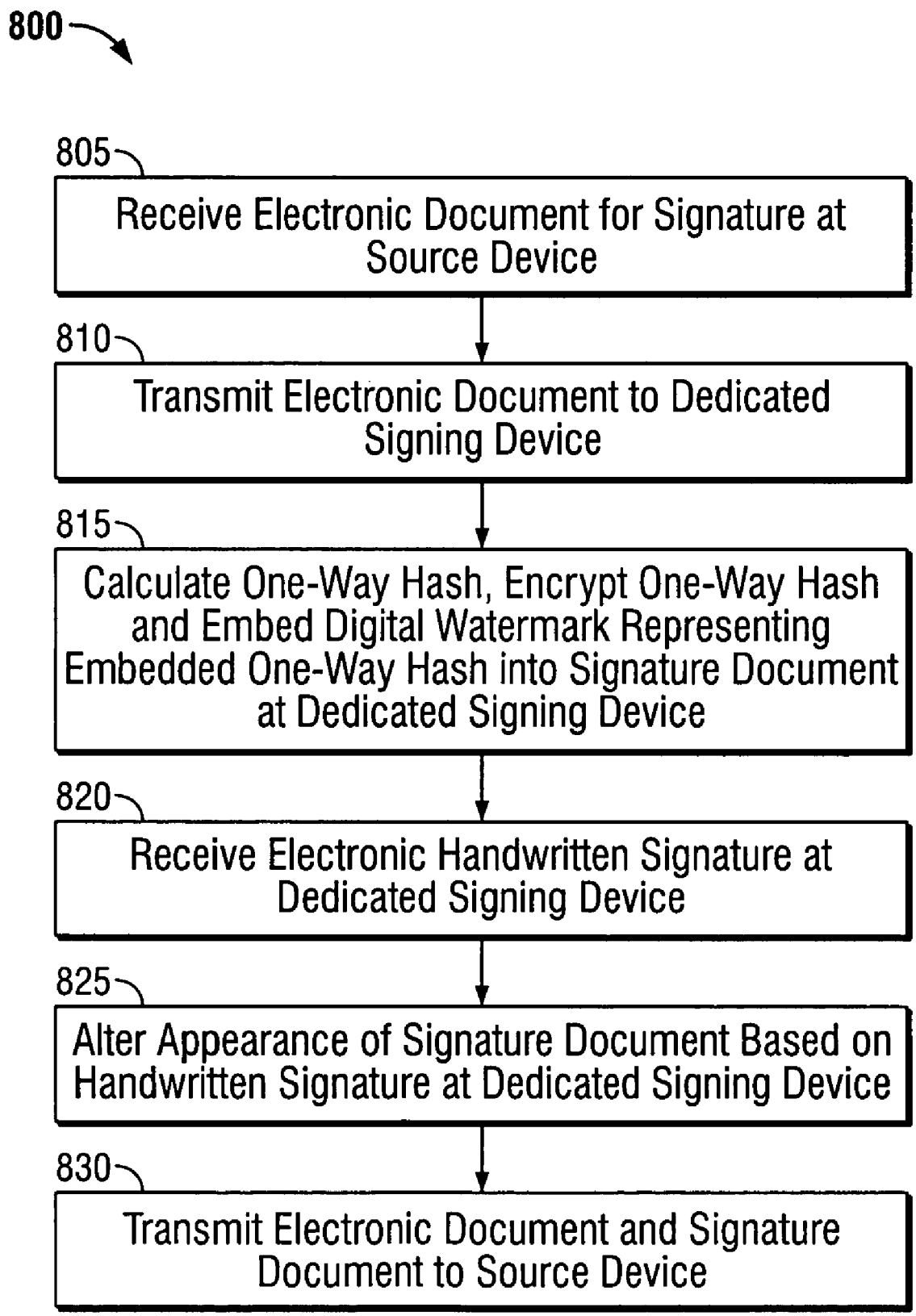
FIG. 8 is a flowchart showing a process for creating an electronic signature using a designated signing device.

FIG. 8 shows a process 800 for electronically signing an electronic document using a dedicated signing device and a source device. An electronic document to be signed is received at the source device (step 805) (i.e., the electronic document is either created using the source device or is received at the source device, for example, via a connection to another device). The source device transmits the electronic document to be signed to the dedicated signing device (step 810). A signer can either view a graphical representation of the electronic document using the source device or the dedicated signing device.

The designated signing device calculates a one-way hash of the electronic document, encrypts the one-way hash using a private key associated with the designated signing device, and embeds a digital watermark representing the encrypted one-way hash into a signature document, for example, a digital image (step 815). The signer handwrites his/her signature electronically over the signature document, for example, using an electronic pen and a touch screen of the designated signing device (step 820). The signature tool 720 alters the appearance of the signature document based on the handwritten signature (step 825), for example, the signature can be applied to the signature document as a black line, irrevocably altering the underlying image data. The designated signing device transmits the signed electronic document, i.e., the electronic document and the signature document, to the source device (830).

Figure 9:
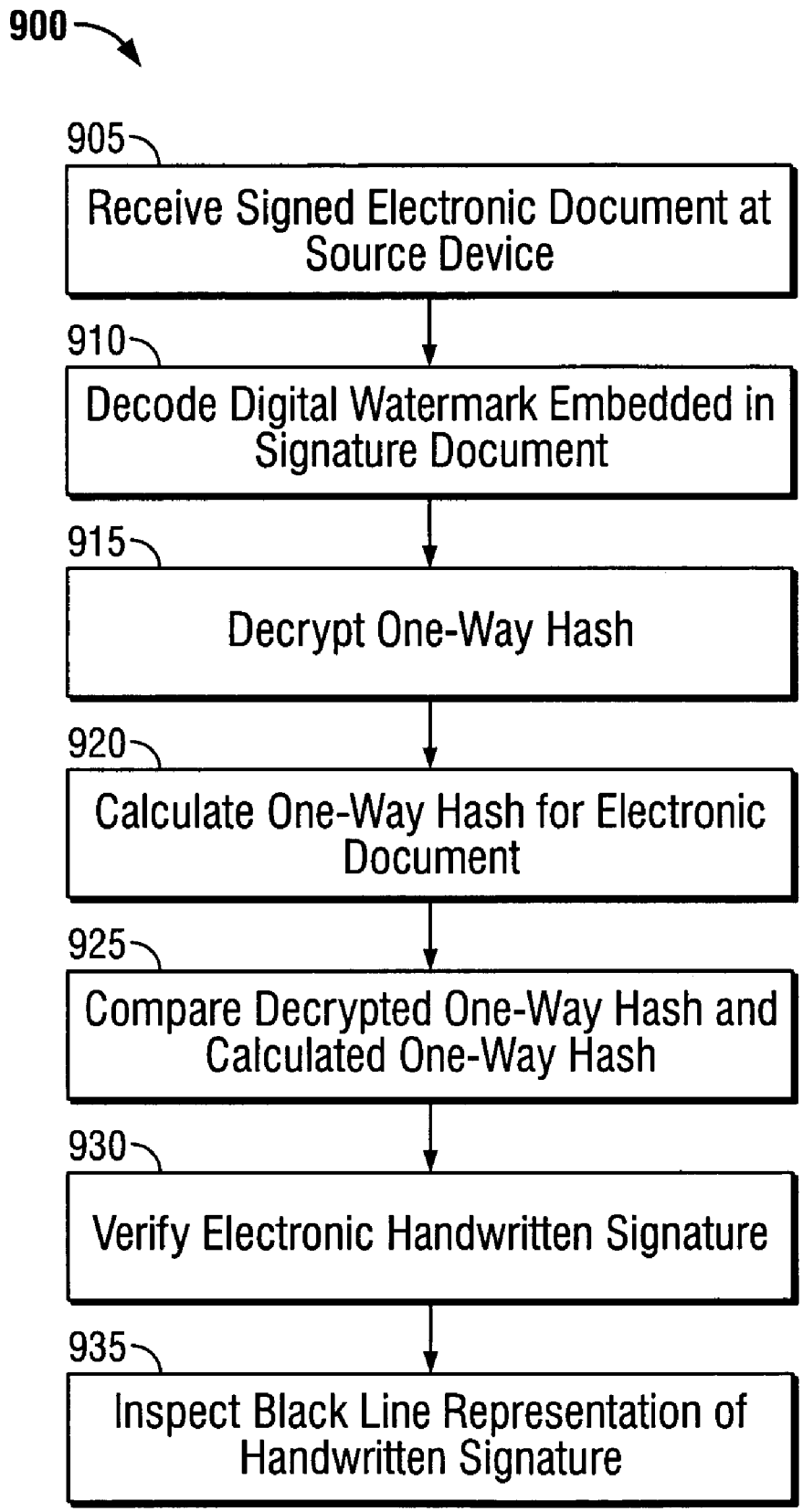
FIG. 9 is a flowchart showing a process for verifying an electronic signature using a source device.

FIG. 9 shows a process 900 for verifying a signed electronic document (i.e., electronic document and signature document) received at a source device from a designated signing device (step 905). A digital watermark embedded in the signature document is decoded (step 910) to retrieve an encrypted one-way hash, and the one-way hash is decrypted (step 915). A one-way hash is calculated for the received electronic document (step 920) and the decrypted one-way hash and the calculated one-way hash are compared (step 925). The electronic handwritten signature is verified (step 930), for example, by visual inspection of someone familiar with the signer's signature, by handwriting analysis or by an electronic comparison to a digitized signature specimen. Optionally, a black line on the signature document representing the handwritten signature can be inspected to confirm the digital watermark was not altered or removed and replaced after the handwritten signature was applied to the signature document (step 935).

If the decrypted one-way hash and the calculated one-way hash match and the handwritten signature is authenticated as a genuine signature of the purported signer, then the electronic signature represented by the signature document is verified. If either the one-way hashes do not match or the handwritten signature is not authenticated, then the electronic signature is not verified.

In other implementations, the roles of the dedicated signing device and the source device can vary. For example, the dedicated signing device can be used solely to accept an electronic handwritten signature and alter a digital image based on the electronic handwritten signature. The one-way hash calculation, encryption and the embedding of a digital watermark representing the encrypted one-way hash into a digital image can be performed by an application executing on the source device. The contents of the electronic document can be displayed to a signer on a graphical user interface at the source device and, in this implementation, the electronic document does not have to be transmitted to the dedicated signing device. Rather, the source device can pass the digital image embedded with the embedded one-way hash to the dedicated signing device, the electronic handwritten signature can be applied using the touch screen, and the signature document (derived from the digital image) can then be transmitted from the dedicated signing device to the source device 704. In such an implementation, the dedicated signing device requires limited functionality.

Implementing the techniques described above in such a dedicated signing device can reduce the risk that an electronic signature can be deliberately falsified. Falsifications, such as deliberately altering the contents of the electronic document after they are displayed and approved by a person signing the document, but before the electronic signature is applied, or forgeries, i.e., falsely applying an image of a handwritten signature to an electronic document without the purported signer's permission, are conceivable using software developed for such purposes. Implementing the signing application in a dedicated signing device that has no peripheral capabilities and/or limited functionality reduces the risk that such falsifications or forgeries could be implemented with the device.

The dedicated signing device can further include security features to prevent alteration of the electronic document to be signed. For example, the dedicated signing device can include a limited user interface that does not provide access to applications stored within the device and executed by the device to generate an electronic signature, e.g., a signing application. The dedicated signing device can include a limited external interface, to also prevent tampering with applications stored within the device, such as a signing application. The device itself can be manufactured as a secure, tamper-proof structure, such that the components within the device, such as a processor executing a signing application, cannot be accessed without permanently disabling the device. The dedicated signing device can have limited functionality, that is, functionality limited to generating an electronic signature and related functions, such that the device does not include functionality that may be required to tamper with the signing application or otherwise.

In one implementation, the signature document can be a sound file, and the electronic handwritten signature can be replaced by an audio recording of the signer's voice overlaying the sound file. The electronic voice signature can be generated and verified using similar techniques described above in reference to an electronic handwritten signature. A representation of a one-way hash of an electronic document to be signed can be embedded as a digital watermark in a sound file forming an audio signature file (i.e., a signature document). The signer can then "electronically sign" the audio signature file by making an audio statement that is captured by a microphone and recorded overlaying the sound file, for example, the signer can speak the words "I agree to this contract".

The electronic signature can be verified by decoding the digital watermark and comparing the embedded one-way hash to a new one-way hash calculated over the signed electronic document; the electronic voice signature can be verified either by someone who recognizes the signer's voice, by an expert comparing the audio recording to a known, valid voice specimen of the signer, or electronically, for example, by voice recognition software. Similarly, for added security, the one-way hash can be encrypted before being embedded into the audio signature file and/or a trusted signing device can be used to create the electronic signature. The electronic voice signature can be created using a device similar to the sending device 102 discussed above in reference to FIG. 1, the sending device 402 of FIG. 4 or the dedicated signing device 702 of FIG. 7. However, the user interface would not require a touch screen, but would require a microphone for recording the electronic voice signature. A receiving device similar to the device 104 shown in FIG. 1, the device 404 shown in FIG. 4 or the source device 704 of FIG. 7 can be used to verify the electronic voice signature, although the user interface would require a speaker to listen to the signature document.

The systems and techniques described here can be realized in digital electronic circuitry, integrated circuitry, specially designed ASICs (application specific integrated circuits), computer hardware, firmware, software, and/or combinations thereof. Implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

A computer program (also known as a program, software, software application or code) can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard, touch screen, microphone and/or a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Although only a few embodiments have been described in detail above, other modifications are possible. The logic flows depicted in FIGS. 2, 3, 5, 6, 8 and 9 do not require the particular order shown, or sequential order, to achieve desirable results. In certain implementations, multitasking and parallel processing may be preferable.

Other embodiments may be within the scope of the following claims.

What is claimed is:

1. A method comprising:
   receiving a signed electronic document comprising an electronic document and a signature document, the signature document including an electronic handwritten signature applied to first image and a digital watermark, wherein the digital watermark is a second image representing a watermark that overlays at least a portion of the first image and embeds in the signature document a first one-way hash calculated using the electronic document, and where the applied electronic signature altered an appearance of the signature document;
   verifying an integrity of the digital watermark based, at least in part, on an integrity of the electronic handwritten signature applied to the image;
   obtaining the first one-way hash from the first image in connection with at least determining the integrity of the digital watermark;
   calculating a second one-way hash for the electronic document;
   comparing the first one-way hash to the second one-way hash; and
   verifying by a receiving device contents of the signed electronic document based at least in part on the one-way hash comparison.

2. The method of claim 1, wherein the electronic signature applied to an image comprises a black line representing a handwritten signature applied to a graphical representation of an image.

3. The method of claim 2, further comprising:
   comparing the electronic handwritten signature to a valid signature specimen; and
   verifying the signature document based at least in part on the signature comparison.

4. The method of claim 2, further comprising:
   inspecting the black line for indications of alterations to the image after the black line was applied.

5. The method of claim 1, wherein the electronic signature applied to an image comprises a black line representing biometric data applied to a graphical representation of an image.

6. The method of claim 5, further comprising:
   comparing the biometric data to expected biometric data; and
   verifying the signature document based at least in part on the comparison of biometric data.

7. The method of claim 5, further comprising:
   inspecting the black line for indications of alterations to the image after the black line was applied.

8. The method of claim 1, wherein the digital watermark represents an encrypted one-way hash, the method further comprising:
   decrypting the one-way hash; and
   comparing the decrypted one-way hash to the second one-way hash.

9. The method of claim 8, wherein decrypting the one-way hash comprises using a public key associated with a device used to encrypt the one-way hash.

10. A system comprising:
    one or more processors configured to:
      receive a signed electronic document comprising an electronic document and a signature document, the signature document including an electronic handwritten signature applied to first image and a digital watermark, wherein the digital watermark is a second image representing a watermark that overlays at least a portion of the first image and embeds in the signature document a first one-way hash calculated using the electronic document, and where the applied electronic signature altered an appearance of the signature document;
      verify an integrity of the digital watermark based, at least in part, on an integrity of the electronic handwritten signature applied to the image;
      obtain the first one-way hash from the image in connection with at least determining the integrity of the digital watermark;
      calculate a second one-way hash for the electronic document;
      compare the first one-way hash to the second one-way hash; and
      verify contents of the signed electronic document based at least in part on the one-way hash comparison.

11. The system of claim 10, wherein the electronic signature applied to an image comprises a black line representing a handwritten signature applied to a graphical representation of an image.

12. The system of claim 11, further comprising:
    the processor further configured to:
      compare the electronic handwritten signature to a valid signature specimen; and
      verify the signature document based at least in part on the signature comparison.

13. The system of claim 11, further comprising:
    the processor further configured to:
      inspect the black line for indications of alterations to the image after the black line was applied.

14. The system of claim 10, wherein the electronic signature applied to an image comprises a black line representing a password applied to a graphical representation of an image.

15. The system of claim 14, further comprising:
the processor further configured to:
compare the password to an expected password; and
verify the signature document based at least in part on the password comparison.

16. The system of claim 14, further comprising:
the processor further configured to:
inspect the black line for indications of alterations to the image after the black line was applied.

17. The system of claim 10, wherein the digital watermark represents an encrypted one-way hash, the processor further configured to:
decrypt the one-way hash; and
compare the decrypted one-way hash to the second one-way hash.

18. The system of claim 17, wherein the processor is further configured to decrypt the one-way hash using a public key associated with a device used to encrypt the one-way hash.

19. A method comprising:
receiving a signed electronic document comprising an electronic document and an audio signature file, the audio signature file including a voice recording applied to a first audio recording and a digital watermark, wherein the digital watermark is a second audio recording representing a watermark that overlays at least a portion of the first audio recording and embeds in the audio signature file a first one-way has calculated using the electronic document, and where the applied electronic signature altered the audio signature file;
verify an integrity of the digital watermark based, at least in part, on an integrity of the voice recording applied to the first audio recording;
obtaining the first one-way hash from the second audio recording in connection with at least determining the integrity of the digital watermark;
calculating a second one-way hash for the electronic document;
comparing the first one-way hash to the second one-way hash; and
verifying by a receiving device contents of the signed electronic document based at least in part on the one-way hash comparison.

20. The method of claim 19, wherein the digital watermark represents an encrypted one-way hash, the method further comprising:
decrypting the one-way hash; and
comparing the decrypted one-way hash to the second one-way hash.

21. The method of claim 20, wherein decrypting the one-way hash comprises using a public key associated with a device used to encrypt the one-way hash.

22. An apparatus comprising a computer-readable medium storing instructions operable to cause a programmable processor to:
receive a signed electronic document comprising an electronic document and an audio signature file, the audio signature file including a voice recording applied to a first audio recording and a digital watermark, wherein the digital watermark is a second audio recording representing a watermark that overlays at least a portion of the first audio recording and embeds in the audio signature file a first one-way has calculated using the electronic document, and where the applied electronic signature altered the audio signature file;
verify an integrity of the digital watermark based, at least in part, on an integrity of the voice recording applied to the first audio recording;
obtain the first one-way hash from the second audio recording in connection with least determining the integrity of the digital watermark;
calculate a second one-way hash for the electronic document;
compare the first one-way hash to the second one-way hash; and
verify by a receiving device contents of the signed electronic document based at least in part on the one-way hash comparison.

23. The apparatus of claim 22, wherein the audio signature file includes an electronic signature applied to an image comprises a black line representing a handwritten signature applied to a graphical representation of an image.

24. The apparatus of claim 23, further comprising instructions operable to:
compare the electronic handwritten signature to a valid signature specimen; and
verify the signature document based at least in part on the signature comparison.

25. The apparatus of claim 23, further comprising instructions operable to:
inspect the black line for indications of alterations to the image after the black line was applied.

26. The apparatus of claim 23, wherein the electronic signature applied to an image comprises a black line representing biometric data applied to a graphical representation of an image.

27. The apparatus of claim 26, further comprising instructions operable to:
compare the biometric data to expected biometric data; and
verify the signature document based at least in part on the comparison of biometric data.

28. The apparatus of claim 26, further comprising instructions operable to:
inspect the black line for indications of alterations to the image after the black line was applied.

29. The apparatus of claim 22, wherein the digital watermark represents an encrypted one-way hash, the instructions further operable to:
decrypt the one-way hash; and
compare the decrypted one-way hash to the second one-way hash.

30. The apparatus of claim 29, wherein instructions operable to decrypt the one-way hash comprise instructions operable to use a public key associated with a device used to encrypt the one-way hash.

31. An apparatus comprising a computer-readable medium storing instructions operable to cause a programmable processor to:
receiving a signed electronic document comprising an electronic document and an audio signature file, the audio signature file including a voice recording applied to a first audio recording and a digital watermark, wherein the digital watermark is a second audio recording representing a watermark that overlays at least a portion of the first audio recording and embeds in the audio signature file a first one-way has calculated using the electronic document, and where the applied electronic signature altered the audio signature file;
verify an integrity of the digital watermark based, at least in part, on an integrity of the voice recording applied to the first audio recording;

obtaining the first one-way hash from the second audio recording in connection with at least determining the integrity of the digital watermark;

calculating a second one-way hash for the electronic document;

comparing the first one-way hash to the second one-way hash; and verifying by a receiving device contents of the signed electronic document based at least in part on the one-way hash comparison.

32. The apparatus of claim 31, wherein the digital watermark represents an encrypted one-way hash, the instructions further operable to:

decrypt the one-way hash; and compare the decrypted one-way hash to the second one-way hash.

33. The apparatus of claim 32, wherein instructions operable to decrypt the one-way hash comprise instructions operable to use a public key associated with a device used to encrypt the one-way hash.

\* \* \* \* \*